No. 896,228. PATENTED AUG. 18, 1908.
J. C. MOORE.
HAND TRUCK.
APPLICATION FILED OCT. 21, 1907.

WITNESSES:
Wilhelm Vogt
Thomas M. Smith

INVENTOR
James C. Moore,
BY
J. Walter Douglass
ATTORNEY.

UNITED STATES PATENT OFFICE.

JAMES C. MOORE, OF PHILADELPHIA, PENNSYLVANIA.

HAND-TRUCK.

No. 896,228.　　　Specification of Letters Patent.　　Patented Aug. 18, 1908.

Application filed October 21, 1907. Serial No. 398,322.

*To all whom it may concern:*

Be it known that I, JAMES C. MOORE, a citizen of the United States, residing at the city of Philadelphia, in the county of Philadelphia and State of Pennsylvania, have invented certain new and useful Improvements in Hand-Trucks, of which the following is a specification.

My invention relates to a hand truck for supporting and transporting boxes, barrels and like articles from place to place by a hand truck; and in such connection it relates more particularly to the constructive arrangement of gripping means for articles to be supported and transported by means of such truck.

The nature, characteristic features and scope of my present invention will be more fully understood from the following description taken in connection with the accompanying drawings forming part hereof, in which—

Figure 1:
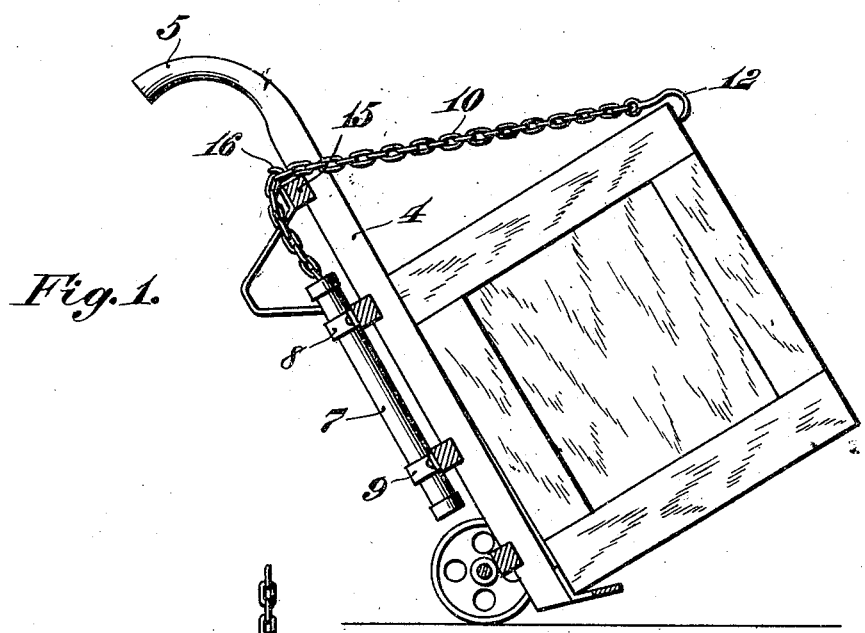
Figure 2:
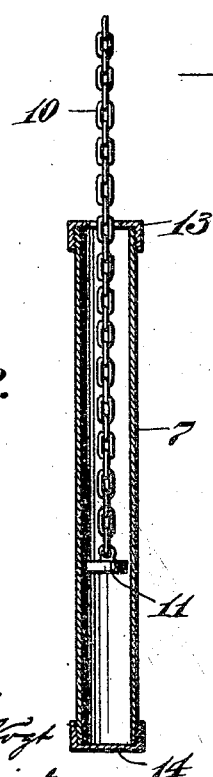
Figure 3:
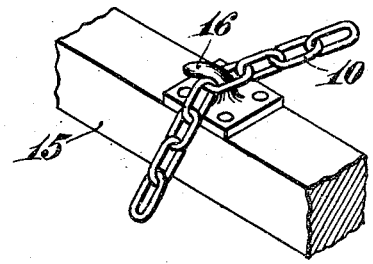

Figure 1 is a view in section and in elevation of a hand truck with a gripping device embodying main features of my invention in application thereto and also showing the truck in a tilted position with a box supported thereon in a gripped condition by means of the said device. Fig. 2 is a vertical sectional view of the housing for the gripping device, showing the chain of the gripping device partially housed; and Fig. 3 is a perspective view of one of the cross-bars of the truck provided with a hook for engaging a link of the chain of the gripping device.

Referring to the drawings 4, is a hand truck of any well known construction, provided with handles 5.

7 is the tubular holder of my invention in application to the underside of the truck lengthwise thereof and clipped thereto at 8 and 9, and within which holder is adapted to be housed and held a chain 10, one end of which is provided with a disk 11, adapted to slide in the holder and the opposite end provided with a claw hook 12, for engaging an article to be gripped by the chain and to be thus supported during the transporting of the article on the truck 4. One end of the holder 7, is provided with a threaded perforated cap 13, through which the chain extends and the opposite end of the holder is either provided with a closed end or imperforate cap 14.

From one of the cross-bars 15, of the truck projects a spur or prong 16, at an angle to the plane of the truck for engaging a link of the chain therewith. Any slack of the chain can readily be taken up by the shifting of the chain so that a link of the chain may be brought into engagement with the prong 16, to thereby tightly hold the article in required position from the truck, either on a plane to the truck or at an angle to the plane thereof, while transporting the article, as shown in Fig. 1. When the gripping chain is not required, it can be all concealed in the holder, save the claw gripping hook 12 thereof, so as to be out of the way while the truck is being used for the handling of articles for which a gripping device is not necessary.

Having thus described the nature and objects of my invention what I claim as new and desire to secure by Letters Patent is:—

In a hand-truck, a holder having a removable perforated cap, a chain provided with a disk and with a claw gripping hook, said chain adapted to be movably concealed within the holder and a prong projecting from the truck-frame and adapted to take up slack of the chain when the claw gripping hook thereof engages an article of said truck, substantially as and for the purposes described.

In witness whereof, I have hereunto set my signature in the presence of two subscribing witnesses.

JAMES C. MOORE.

Witnesses:
J. WALTER DOUGLASS.
THOMAS M. SMITH.